US007611629B2

(12) United States Patent
Doucoure et al.

(10) Patent No.: US 7,611,629 B2
(45) Date of Patent: Nov. 3, 2009

(54) UV TREATED MEMBRANES

(75) Inventors: Abdoulaye Doucoure, Levittown, NY (US); Richard F. Salinaro, Hastings on Hudson, NY (US); Yoshiki Mizuno, Ibaraki (JP)

(73) Assignee: Pall Corporation, Port Washington, NY (US)

( * ) Notice: Subject to any disclaimer, the term of this patent is extended or adjusted under 35 U.S.C. 154(b) by 186 days.

(21) Appl. No.: 10/520,080

(22) PCT Filed: Jul. 9, 2003

(86) PCT No.: PCT/US03/21438

§ 371 (c)(1),
(2), (4) Date: Jan. 5, 2005

(87) PCT Pub. No.: WO2004/007060

PCT Pub. Date: Jan. 22, 2004

(65) Prior Publication Data

US 2005/0247629 A1  Nov. 10, 2005

Related U.S. Application Data

(60) Provisional application No. 60/394,865, filed on Jul. 11, 2002.

(51) Int. Cl.
*B01D 71/36* (2006.01)
*B01D 71/30* (2006.01)
(52) U.S. Cl. .............. 210/500.36; 210/500.22; 210/500.42; 427/581; 525/326.4
(58) Field of Classification Search ............. None
See application file for complete search history.

(56) References Cited

U.S. PATENT DOCUMENTS

| 3,935,096 A | * | 1/1976 | Eng et al. ............ 423/181 |
| 3,978,341 A | | 8/1976 | Hoell |
| 4,287,032 A | | 9/1981 | Pellegri |
| 4,618,533 A | | 10/1986 | Steuck |
| 4,879,176 A | | 11/1989 | Ouderkirk et al. |
| 4,925,572 A | | 5/1990 | Pall |
| 4,946,903 A | * | 8/1990 | Gardella et al. ......... 525/326.4 |
| 4,981,770 A | | 1/1991 | Taylor |
| 5,051,312 A | | 9/1991 | Allmér |
| 5,053,132 A | * | 10/1991 | Sirkar ................ 210/500.23 |
| 5,130,024 A | * | 7/1992 | Fujimoto et al. ........ 210/500.36 |
| 5,158,680 A | * | 10/1992 | Kawai et al. ........... 210/321.61 |
| 5,198,505 A | * | 3/1993 | Sipsas et al. ............ 525/326.2 |
| 5,209,849 A | | 5/1993 | Hu et al. |
| 5,232,600 A | | 8/1993 | Degen et al. |
| 5,320,789 A | | 6/1994 | Nishii et al. |
| 5,362,525 A | | 11/1994 | Nishii et al. |
| 5,437,900 A | * | 8/1995 | Kuzowski ............... 428/36.1 |
| 5,468,560 A | | 11/1995 | McPherson et al. |
| 5,555,549 A | | 9/1996 | Nakaishi |
| 5,630,941 A | | 5/1997 | Burger et al. |
| 5,635,257 A | | 6/1997 | Nishii et al. |
| 5,718,957 A | * | 2/1998 | Yokoe et al. ............ 428/36.91 |
| 5,721,293 A | | 2/1998 | Ichinose et al. |
| 5,730,924 A | | 3/1998 | Katoh et al. |
| 5,789,755 A | | 8/1998 | Bender |
| 5,798,261 A | | 8/1998 | Koontz |
| 5,811,251 A | * | 9/1998 | Hirose et al. .................. 435/8 |
| 5,859,086 A | | 1/1999 | Freund et al. |
| 5,914,182 A | | 6/1999 | Drumheller |
| 5,928,792 A | | 7/1999 | Moya |
| 5,972,176 A | | 10/1999 | Kirk et al. |
| 5,980,637 A | | 11/1999 | Singh et al. |
| 6,117,497 A | * | 9/2000 | Murahara et al. .......... 427/581 |
| 6,689,426 B1 | | 2/2004 | Murahara et al. |

FOREIGN PATENT DOCUMENTS

JP  7-178318  7/1995

OTHER PUBLICATIONS

Ichinose, N. et al., *Langmuir*, 13(22):5805-5807 (1997).
Ichinose, N. et al., *Macromolecules*, 29(11):4155-4157 (1996).

* cited by examiner

*Primary Examiner*—Krishnan S Menon
(74) *Attorney, Agent, or Firm*—Leydig, Voit & Mayer, Ltd.

(57) ABSTRACT

Non-coherent UV-treated porous halopolymer membranes are disclosed.

26 Claims, No Drawings

UV TREATED MEMBRANES

CROSS-REFERENCE TO RELATED PATENT APPLICATIONS

This patent application claims the benefit of U.S. Provisional Patent Application No. 60/394,865, filed Jul. 11, 2002, which is incorporated by reference.

FIELD OF THE INVENTION

This invention relates to UV treated membranes, particularly microporous fluoropolymer membranes exposed to UV non-coherent light radiation.

BACKGROUND OF THE INVENTION

Certain chemically resistant polymer membranes, for example, fluoropolymer membranes, are used for treating challenging fluids such as corrosive or chemically active liquids. Treatment of such fluids requires that the membranes resist chemical degradation.

However, many of these fluids, which are aqueous based, do not adequately wet the membrane surfaces which are generally of low surface energy. This inadequate wetting leads to low fluid permeability and/or high pressure drops across the membrane. This phenomenon is commonly explained by the occurrence of sites which favor the nucleation and growth of gas bubbles. Attempts have been made to improve wetting by providing a hydrophilic coating. However, many of these attempts are not satisfactory as, for example, liquid permeabilities of such membranes are still low or only marginally improved.

Further, some of the challenging liquids include high purity water, ozonated water, organic solvents, and corrosive liquids such as concentrated acids or bases. Some of these liquids may, in addition, contain an oxidizer such as a peroxide, e.g., hydrogen peroxide. These liquids tend to outgas during treatment by a membrane.

It is believed that as the liquids outgas, the gas displaces the liquid from the membrane pores. This displacement phenomenon is called "dewetting" and results in reduced effective membrane filtration area, and, consequently, reduced overall filtration efficiency. Thus, dewetting can lead to reduced permeate throughput and/or increased pressure drop.

Proposals have been made to reduce the dewetting problem. For example, membranes have been treated to rewet the dewetted membrane, e.g., by the use of a surfactant or repeated treatment with a low surface tension liquid such as isopropanol. Such approaches are not satisfactory as they involve additional costs and process steps to remove the solvent completely.

Thus, there exists a need for a wettable membrane that resists dewetting when exposed to outgassing liquids. There further exists a need for membranes that are capable of resisting degradation by challenging liquids so that the release of extractables from the membranes into the processed fluid is minimal or eliminated. There is also a need for chemically resistant membranes having a high liquid permeability.

The present invention provides for ameliorating at least some of the disadvantages of the prior art. These and other advantages of the present invention will be apparent from the description as set forth below.

BRIEF SUMMARY OF THE INVENTION

The invention provides a porous halopolymer membrane, preferably, a microporous membrane, that resists dewetting.

In accordance with an embodiment of the invention, a porous halopolymer membrane is provided comprising a first surface and a second surface and a thickness defined by the first and second surfaces, the membrane having a critical wetting surface tension (CWST) of at least 26 dynes/cm through the thickness of the membrane, a wetting/dewetting ratio of at least about 0.7 for two or more cycles, and wherein at least one surface has a fluorine/carbon (F/C) ratio of about 1.2 or more.

In another embodiment, a porous halopolymer membrane comprises a first surface and a second surface and a thickness defined by the first and second surfaces, the membrane having a CWST of at least 26 dynes/cm through the thickness of the membrane, a water bubble point of at least about 33 psi, and wherein at least one surface has a F/C ratio of about 1.2 or more.

Preferably, the membrane is substantially free of extractables, particularly metal residues.

In more preferred embodiments, a filter is provided comprising the porous halopolymer membrane.

A method for producing a porous halopolymer membrane according to an embodiment of the membrane comprises exposing a porous halopolymer membrane to non-coherent UV radiation to produce a porous halopolymer membrane comprising a first surface and a second surface and a thickness defined by the first and second surfaces, the membrane having a CWST of at least 26 dynes/cm through the thickness of the membrane, a water bubble point of at least about 33 psi, a wetting/dewetting ratio of at least about 0.7 for 2 or more cycles, and wherein at least one surface has a F/C ratio of about 1.2 or more.

In another embodiment, a method for producing a porous halopolymer membrane is provided, comprising contacting a porous halopolymer membrane with a liquid to provide a liquid-treated membrane; and exposing the liquid-treated membrane to non-coherent UV radiation.

DETAILED DESCRIPTION OF THE INVENTION

A porous halopolymer membrane according to an embodiment of the invention comprises a first surface and a second surface and a thickness defined by the first and second surfaces, the membrane having a CWST of at least 26 dynes/cm through the thickness of the membrane, a wetting/dewetting ratio of at least about 0.7 for 2 or more cycles, and wherein at least one surface has a F/C ratio of about 1.2 or more.

In another embodiment of the invention, a porous halopolymer membrane is provided comprising a first surface and a second surface and a thickness defined by the first and second surfaces, wherein at least one of the first and second surfaces has a F/C ratio of about 1.2 or more, the membrane having a wetting/dewetting ratio of at least about 0.7 for 2 or more cycles, and a low level of extractables.

A porous halopolymer membrane according to yet another embodiment of the invention comprises a first surface and a second surface and a thickness defined by the first and second surfaces, wherein at least one surface has a F/C ratio of about 1.2 or more, the membrane having a water bubble point of at least about 33 psi, and a low level of extractables.

In another embodiment of the invention, a porous halopolymer membrane comprises a first surface and a second surface and a thickness defined by the first and second surfaces, the membrane having a CWST of at least 26 dynes/cm through the thickness of the membrane, a water bubble point of at least about 33 psi, and wherein at least one surface has a F/C ratio of about 1.2 or more.

In yet another embodiment, a microporous halopolymer membrane comprises a first surface and a second surface and a thickness defined by the first and second surfaces, the surfaces each being ungrafted and having F/C ratio of about 1.2 or more, the membrane having a CWST of at least 26 dynes/cm through the thickness of the membrane, a wetting/dewetting ratio of at least about 0.7 for 2 or more cycles, and a low level of extractables.

In preferred embodiments of the invention, the porous halopolymer membrane is a microporous membrane.

In some embodiments, the porous membrane has a CWST in the range of from 26 to about 30 dynes/cm through the thickness of the membrane. In other embodiments, the membrane has a CWST of at least about 40 dynes/cm, or at least about 45 dynes/cm, through the thickness of the membrane.

A method for producing a porous halopolymer membrane according to an embodiment of the invention comprises exposing a porous halopolymer membrane to non-coherent UV radiation to produce a porous halopolymer membrane comprising a first surface and a second surface and a thickness defined by the first and second surfaces, the membrane having a critical wetting surface tension (CWST) of at least 26 dynes/cm through the thickness of the membrane, a water bubble point of at least about 33 psi, a wetting/dewetting ratio of at least about 0.7 for 2 or more cycles, and wherein at least one surface has a F/C ratio of about 1.2 or more.

In accordance with another embodiment, a method for producing a porous membrane comprises contacting a porous halopolymer membrane with a liquid to provide a liquid-treated porous halopolymer membrane; and exposing the liquid-treated membrane to non-coherent UV radiation.

In accordance with yet another embodiment, a method for reducing or eliminating dewetting of a porous halopolymer membrane when contacted with a degassing fluid comprises contacting a porous halopolymer membrane with a liquid to provide a liquid-treated membrane; and exposing the liquid-treated membrane to non-coherent UV radiation.

Preferably, the non-coherent UV radiation has a wavelength in the range of from about 140 to about 350 nm. In some embodiments, the liquid-treated membrane is exposed to non-coherent UV radiation two or more times.

The present invention provides porous halopolymer membranes which resist dewetting, e.g., when contacted with outgassing (or degassing) fluids, particularly, for example, high temperature liquids. The membranes are chemically stable and wettable by many fluids. The water wettable membranes can be shipped in dry form. The membranes have low levels of extractables, e.g., they are also substantially free of extractables (for example, metals, particles of organic and/or inorganic residues, and resins, such as particles of polymeric material). The membranes of the present invention are free of a wetting agent, and/or a coating. The membranes are integral membranes, and, unlike composite membranes, the surfaces and the bulk are composed of substantially the same material, and the surfaces and the bulk have many of the same properties. The membranes can be used to treat challenging fluids such as corrosive or chemically active liquids, and can be used in applications in which the membranes are exposed to harsh conditions, such as in batteries, filtration apparatuses, and the like.

The present invention further provides a method for preparing a porous halopolymer membrane which resists dewetting comprising treating a hydrophobic porous halopolymer membrane with ultraviolet (UV) incoherent (sometimes referred to as non-coherent) light radiation to obtain a UV treated membrane. Incoherent radiation refers to light sources emitting light wherein all emitted photons have random phases as they propagate, In contrast, coherent radiation refers to light sources emitting light wherein all emitted photons are in phase with each other as they propagate. For example, lasers emit coherent radiation.

In an embodiment, the present invention provides a porous halopolymer membrane which is hydrophilic and has a higher water permeability than a porous hydrophobic halopolymer membrane of substantially the same pore size and thickness, wherein the hydrophilic and hydrophobic membranes comprise substantially the same halopolymer. The hydrophilic membrane preferably has a water permeability that is at least 2 or more times greater than that of the hydrophobic membrane, and more preferably 10 times greater than that of the hydrophobic membrane. The hydrophilic surface helps reduce nucleation and/or growth of microbubbles which are implicated in dewetting.

In another embodiment, the present invention provides a porous halopolymer membrane comprising a first surface and a second surface which resists dewetting when the membrane is contacted on one of the first and second surfaces with a degassing fluid and the other of the first and second surfaces is maintained at a pressure lower than that of the surface contacting the fluid.

The present invention also provides a method for treating a fluid comprising passing the fluid through a membrane produced according to the invention.

The membranes of the present invention can be prepared from suitable halopolymers, and preferably fluoropolymers. The halopolymers can be homopolymers, copolymers, or combinations thereof. Examples of suitable halopolymers include amorphous polymers comprising fluorine, polytetrafluoroethylene (PTFE), polychlorotrifluoroethylene (PCTFE), polychlorotrifluoroethylene-co-ethylene (E/CTFE-polymer), polytetrafluoroethylene-co-hexafluoropropylene (FEP), polytetrafluoroethylene-co-perfluoro (alkylvinyl ether) (PFA), polytetrafluoroethylene-co-ethylene (E/TFE), polyvinyl fluoride (PVF), polyvinylidene fluoride (PVDF), copolymers of vinylidene fluoride, perfluoroethylene-propylene copolymers, and polyvinyl chloride.

The membranes of the present invention typically have a nominal pore size of about 0.01 micrometers ($\mu$m) or greater, for example, from about 0.02 $\mu$m to about 10 $\mu$m, preferably from about 0.03 $\mu$m to about 0.5 $\mu$m, and more preferably from about 0.03 $\mu$m to about 0.1 $\mu$m.

The membranes of the present invention resist dewetting when contacted with outgassing liquids. Thus, dewetting can be advantageously prevented for extended periods of time, e.g., typically greater than about 1 hour, preferably greater than about 2 hours, and more preferably from about 5 hours to about 10 hours or more. For example, in hot concentrated sulfuric acid containing a peroxide, dewetting resistance can be realized for a period of from about 5 hours to about 42 hours or more. Embodiments of the membranes of the present invention resist dewetting up to 5 cycles (cycles defined below), or more, when contacted with a mixture containing hydrogen peroxide, ammonium hydroxide, and water at 90° C., each cycle covering a period of 2 hours.

The dewetting resistance can be determined by a suitable method, for example, as follows. A piece of the membrane, e.g., a 47 mm disc, is pre-wet in isopropanol, followed by soaking in deionized water (DI) so that the isopropanol in the membrane is exchanged with water. The membrane is placed in a filtering apparatus, e.g., a glass frit connected to a Buchner funnel, connected to a source of vacuum. 100 mL of DI water at 70° C. is placed on one side of the membrane and a vacuum, of about –9 inches (about –229 mm) of Hg is applied to the other side of the membrane. Inasmuch as isopropanol may be needed initially in an effort to fill the pores of the membrane with water, the membrane can operate for extended periods of time without dewetting as well as the need for rewetting by isopropanol.

The membrane is visually checked for any dewetting during the period when the DI water flows through the membrane. The time it takes for the water to flow through is recorded. This is considered the first filtering (or wetting) cycle. The vacuum is maintained for a period of 2 minutes after the upstream side is empty, and the membrane is checked for any dewetting. The vacuum is removed and the system is brought to atmospheric pressure. The upstream side is refilled with another 100 mL of DI water at about 70° C. to about 80° C., and the water allowed to flow through under an applied vacuum, and the flow time is recorded, along with checking for any dewetting. This is considered the second (or the dewetting) cycle. Typically, the wetting/dewetting ratio is at least about 0.7 for a wetting/dewetting cycle (i.e., 2 cycles). In more preferred embodiments, the ratio is at least about 0.8, and in some embodiments, the ratio is at least about 0.9, for a wetting/dewetting cycle. In even more preferred embodiments, the ratio is at least about 0.8, and in some embodiments, at least about 0.9, for at least 3 cycles (wetting/dewetting/wetting). Embodiments of the membrane of the present invention resist dewetting up to 5 cycles (i.e., wetting, dewetting, wetting, dewetting, wetting) or more.

Certain embodiments of the membrane are wettable by liquids having surface tension values up to about 54 dynes/cm (0.54 erg/mm$^2$) or higher, in some embodiments, about 72 dynes/cm (0.72 erg/mm$^2$) or higher. Certain other embodiments of the membrane are wettable by liquids having surface tension values less than about 45 dynes/cm (0.45 erg/mm$^2$), for example, about 33 dynes/cm (0.33 erg/mm$^2$), or 26 dynes/cm (0.26 erg/mm$^2$).

Embodiments of the porous halopolymer membrane of the present invention have a substantially uniform critical wetting surface tension (CWST; as defined, for example, in U.S. Pat. No. 4,925,572) through the thickness of the membrane. For example, in some embodiments, the membrane has a CWST through the bulk (or interior) of the membrane, i.e., from one surface to the other surface, of about 26 dynes/cm (0.26 erg/mm$^2$) or more, typically, about 30 dynes/cm (0.30 erg/mm$^2$) or more, and in some embodiments, about 40 dynes/cm (0.40 erg/mm$^2$). Embodiments according to the invention have CWSTs through the bulk of the membrane of about 44 dynes/cm (0.44 erg/mm$^2$) or more, for example, about 58 dynes/cm (0.58 erg/mm$^2$) or more, or about 72 dynes/cm (0.72 erg/mm$^2$) or more In some embodiments, the membrane has a CWST through the bulk of the membrane in the range of from 26 dynes/cm to about 30 dynes/cm (0.26 erg/mm$^2$ to 0.30 erg/mm$^2$). Such membranes are not only particularly useful for some filtration applications involving aggressive chemicals where resistance to dewetting is desirable, but are also useful in various assays wherein a low fluorescent background is advantageous.

The uniformity of the CWST through the thickness of the membrane can be determined by a suitable method, for example, as follows. The membrane is contacted with a liquid having a surface tension of at least 26 dynes/cm (0.26 erg/mm$^2$). For membranes having a substantially uniform CWST through the thickness, the liquid wets through the membrane (i.e., from one surface, through the bulk, and through the other surface), and the membrane (that is initially opaque) becomes transparent. For membranes lacking a substantially uniform CWST, the liquid may spread at the surface where the liquid is applied, but does not pass through to the other surface, and at least a portion of the membrane remains opaque. Without being bound to any particular theory, it is believed the refractive index of the liquid is substantially equivalent to the refractive index of the polymer used to provide the membrane. Accordingly, membranes having substantially uniform CWSTs are substantially wetted therethrough, and there is little or no air (which has a different refractive index than the liquid) in the membrane. Thus, the membranes appear transparent. Membranes lacking a substantially uniform CWST have air in some of the pores, and the different refractive index of air scatters light, and thus, portions of the membrane appear opaque.

The porous halopolymer membrane of the present invention, in an embodiment, includes a first and/or a second surface having a fluorine/carbon (F/C) ratio of at least about 1.2, preferably, at least about 1.5, or more. For example, the F/C ratio can be in the range of from about 1.7 to about 1.9. Preferably, the UV treatment (described below) does not remove a significant amount of fluorine atoms from the surface(s) of the membrane.

In some embodiments, the membrane has a first and/or second surface having an oxygen/carbon (O/C) ratio of about 0.15 or less, preferably, in the range from about 0.01 to about 0.1, even more preferably, from about 0.01 to about 0.05.

Some embodiments of membranes according to the invention have a negative zeta potential, e.g., at least about −3 mV. Illustratively, the zeta potential can be in the range of from −3mV to about −11 mV at a pH in the range of from about 4 to about 9.

In some embodiments, particularly wherein the porous membrane has a pore size of about 0.1 microns or less, the porous halopolymer membrane of the present invention comprises a UV non-coherent light treated porous fluoropolymer membrane, the treated membrane having a water bubble point at least about 30% greater than that of a non UV light treated porous fluoropolymer membrane of substantially the same thickness and average pore size, wherein the UV treated and non UV treated membranes comprise the same fluoropolymer. Without being bound to any particular theory, it is believed that the increased water bubble point and improved wettability of membranes produced in accordance with the invention reflects, at least in part, that the walls of the pores are being wetted and bubble formation at the wall surface is substantially reduced. Accordingly, the pores retain water, the impregnated pores and wetted pore walls resist the passage of air therethrough, and the water bubble point is increased.

Illustratively, in some embodiment of a porous halopolymer membrane according to the invention, e.g., wherein the treated membrane and untreated membrane have a nominal pore size of from about 0.02 microns to about 0.1 microns, the untreated membrane has a water bubble point in the range of from about 20 to about 25 psi (about 137.8 kPa to about 172.3 kPa), and the UV non-coherent light treated membrane has a water bubble point of about 33 psi (about 227.5 kPa) or more, or about 120 psi (about 827 kPa) or less, e.g., from about 35 psi (about 241.2 kPa) to about 50 psi (about 344.5 kPa), and preferably from about 37 psi (about 255.1 kPa) to about 43 psi (about 296.5 kPa).

The porous halopolymer membrane of the present invention include macropores (pore diameter or width greater than 50 nm) and are free or substantially free of very small pores (sometimes referred to as "voids") such as micropores (pore diameter or width of 0.5 na to 2.0 nm) or mesopores (pore diameter or width of 2 nm to about 50 nm). In embodiments, the membrane is free or substantially free of both micropores and mesopores. It is believed that the paucity or absence of micropores and/or mesopores helps prevent nucleation and/or growth of bubbles, and contribute to the dewetting resistance.

The size of the pores can be estimated by any suitable method, for example, by scanning or transmission electron microscopy, atomic force microscopy, bubble point measurement, mercury intrusion porometry, and/or permeation measurement. The micropores can be characterized by the Brunauer, Emmett, and Teller (BET) analysis method. In embodiments, the BET surface area of the micropores is from about 0.01 to about 0.9 m$^2$/g, preferably from about 0.1 to about 0.7 m$^2$/g, and more preferably from about 0.1 to about 0.5 m$^2$/g. The BET volume of the micropores is from about $1\times10^{-5}$ to about $1\times10^{-4}$ mL/g, and preferably from about $1\times10^{-5}$ to about $5\times10^{-5}$ mL/g. In a particular embodiment, for example, the membrane has a BET micropore area of 0.48 m$^2$/g, a micropore volume of $5.04\times10^{-5}$ mL/g, a multi-point area of $9.99\pm0.50$ m$^2$/g, a total pore volume of 0.16 mL/g, and an average pore diameter of 651.6 Å.

The membranes in accordance with embodiments of the present invention are substantially free of particulates or loose fibrils. Moreover, the membranes of the present invention can be prepared substantially free of contaminants, particularly extractables, e.g., metal residues. For example, the membrane or filter can comprise less than about 500 parts per million (ppm) extractable matter, such as less than about 100 ppm or even 50 ppm extractable matter (e.g., less than about 15 ppm extractable matter), such as less than about 1 ppm extractable matter. More preferably, the membrane or filter comprises less than about 30 parts per billion (ppb) metal extractable matter such as less than about 15 ppb metal extractable matter (e.g., less about 5 ppb metal extractable matter).

Additionally, since preferred membranes and filters according to the present invention can be practically chemically inert, the structural integrity of the membrane and filter is maintained even upon prolonged contact with very strong industrial solvents and wherein substantially no material leaches from the membrane and filter into a fluid in contact with the membrane and filter. Such extractables-free, and preferably, chemically inert, membranes and filters are attractive for use in applications where high purity liquids, particularly, high purity challenging liquids (such as corrosive and/or chemically active liquids) are desired.

Membranes prepared according to the invention have low levels of extractables. Typically, embodiments of membranes prepared according to the invention have levels of extractables comparable to that of native, unmodified, PTFE membranes. Preferably, commercially available unmodified PTFE membranes and Uw treated membranes according to the invention, when treated in the same manner, e.g., by extracting once or twice with suitable extractants such as acid washes (for example, a dilute acid solution such as 5% hydrochloric acid), have substantially the same level of extractables.

As the membranes of the present invention are free of coatings (e.g., the surfaces are ungrafted and/or free of, for example, a sulfonated polymer coating), and metal residues, as well as being substantially free of particulates and loose fibrils, the membrane does not leach materials into the process fluid (e.g., the filtrate and/or the retentate). Thus, for example, the membrane does not add contaminants such as organic carbon and sulfur into the treated fluid. The total organic carbon (TOC) content and/or the total inorganic content of the extracts is low.

UV non-coherent light radiation treated membranes according to preferred embodiments of the invention essentially maintain their tensile strengths during UV treatment. For example, in an embodiment, the membrane comprises a UV light treated porous fluoropolymer membrane, the UV-treated membrane having a tensile strength in the range of from about 80% to about 100% of a non UV-treated porous fluoropolymer membrane of substantially the same thickness, wherein the UV treated and non UV treated membranes comprise the same fluoropolymer.

Additionally, the UV treatment does not significantly affect the retention characteristics of the membranes.

As used herein, "UV non-coherent light radiation" includes vacuum UV treatment, high power UV treatment, broadband UV treatment, and black body UV treatment. The UV radiation source can provide, for example, a continuous spectrum of wavelengths, a series of peaks, or a single emission line. Typically, UV treatment via a low pressure mercury lamp is less desirable according to the invention.

The present invention provides a method of producing a porous membrane comprising a porous halopolymer membrane comprising a first surface and a second surface and a thickness defined by the first and second surfaces, the membrane having a CWST of at least 26 dynes/cm (0.26 erg/mm$^2$) through the thickness of the membrane, a wetting/dewetting ratio of at least about 0.7 for two or more cycles, and wherein at least one surface has a F/C ratio of about 1.2 or more. In an embodiment, the method comprises exposing a microporous halopolymer membrane to UV non-coherent light radiation for a desired period of time. Typically, the method includes contacting the porous (preferably microporous) membrane with at least one fluid to impregnate the pores of the membrane with the fluid, and exposing the fluid-impregnated porous membrane to the UV non-coherent light radiation. The method can include repeatedly exposing the membrane to UV non-coherent radiation, and typically includes re-impregnating the membrane with a fluid between exposures to UV radiation.

The UV non-coherent radiation source is preferably capable of generating radiation having a broadband. For example, the broadband may comprise a distribution of wavelengths within a UV subband from about 100 nm to about 400 nm, e.g., a subband from about 150 nm to about 350 nm. Alternatively, the radiation source may be capable of generating narrower band radiation, e.g., radiation within a narrower subrange, such as, for example, about 100 nm to about 200 nm (Vacuum Ultraviolet), about 200 nm to about 280 nm (UVC), about 280 nm to about 315 nm (UVB), and/or about 315 nm to about 400 nm (UVA). The radiation source may also be capable of generating more discrete wavelengths of radiation.

Typically, the intensity (or the power density) of the Vacuum Ultraviolet (VUV) radiation source is in the range of from about 5 mW/cm$^2$ to about 100 mW/cm$^2$, preferably in the range of from about 5 mW/cm$^2$ to about 20 mW/cm$^2$, for a total treatment time period in the range of from about 1 minute to about 60 minutes, preferably, from about 5 minutes to about 20 minutes, even more preferably, from about 1 to about 5 minutes.

Typically, the intensity (or the power density) of the broadband radiation source. preferably, a medium pressure mercury lamp, is in the range of from about 10 mW/cm$^2$ to about 1000 mW/cm$^2$, preferably in the range of from about 10 mW/cm$^2$ to about 200 mW/cm$^2$, for a total treatment time period in the range of from about 5 seconds to about 300 seconds, more preferably, about 5 to about 120 seconds.

Typically, the intensity (or the power density) of the pulsed blackbody radiation source is in the range of from about 53,000 W/cm$^2$ to about 85,000 W/cm$^2$, for a total treatment time period in the range of from about 1 second to about 300 seconds, preferably in the range from about 1 second to about 120 seconds, even more preferably, in the range of from about 1 second to about 60 seconds.

The UV non-coherent radiation source may be capable of emitting a continuous stream of radiation. A variety of suitable UV non-coherent sources are commercially available, e.g., using electrode-containing bulbs, or electrodeless bulbs. Suitable sources include, for example, Fusion UV Systems, Inc. (Gaithersburg, Md.) (e.g., excimer and mercury lamps), Pulsar Remediation Technologies, Inc. (Roseville, Calif.), UV Process Supply, Inc. (Chicago, Ill.), USHIO America, Inc. (Cypress, Calif.), M.D. Excimer, Inc. (Yokohama Kanagawa, Japan), Resonance Ltd. (Ontario, Canada) and Harada Corporation (Tokyo, Japan).

However, in a preferred embodiment, the radiation source is capable of delivering pulses of radiation in short bursts. A pulsed radiation source is energy efficient and is capable of delivering high intensity radiation. Most preferably, the radiation source is capable of delivering pulsed, broadband, blackbody radiation, as described, for example, in U.S. Pat. No. 5,789,755, herein incorporated by reference. Such pulsed, broadband, blackbody radiation assemblies are available from, for example, Pulsar Remediation Technologies, Inc.

The UV treatment described above does not remove a significant amount of fluorine atoms from the surface of the membrane. The produced membranes are stable and the treatment is permanent, e.g., the effects of the UV incoherent treatment do not wash away under acidic conditions. For example, the UV treated PTFE membrane is stable to a 5-hour soak in cold sulfuric acid (96%), and the membranes preserve their physico-chemical properties after a 3-day heat treatment at 170° C. in air. The UV treated PTFE membrane is also stable when exposed to a recirculating hot sulfuric acid (96%) peroxide (3% or less) mixture for three hours.

Either, or both, surfaces of the membrane can be exposed to UV radiation in accordance with the invention.

Typically, the membrane to be exposed to UV radiation is placed in contact with at least one fluid, preferably a liquid (e.g., to impregnate the pores of the membrane with the liquid) before exposing the membrane to the UV radiation. If desired, the membrane can remain fully or partially immersed in the fluid during exposure to the radiation. Alternatively, for example, the membrane can be removed from the fluid before exposure to the radiation.

A variety of fluids are suitable for contacting the membrane before exposure to UV radiation. Suitable fluids include water (such as deionized water, and heavy water), alcohols, aromatic compounds, silicone oil, trichloroethylene, carbon tetrachloride, fluorocarbons (e.g., freon), phenols, organic acids, ethers, hydrogen peroxide, sodium sulfite, ammonium sulfate (e.g., t-butyl ammonium sulfate), ammonium sulfite, sodium aluminate, copper sulfate, boric acid, hydrochloric acid, and nitric acid. Typically, the liquid impregnating the pores of the membrane while the membrane is exposed to UV radiation absorbs in the range of generated wavelength of the UV radiation source.

In some embodiments, the membrane is contacted with a plurality of fluids before UV treatment. For example, the membrane can be immersed in a first fluid, e.g., an organic solvent (such as methanol, ethanol, acetone, ether, or isopropyl alcohol), preferably, wherein the first fluid has a high compatibility with water and a surface tension of about 30 dynes/cm or less, and the membrane can be immersed in a second fluid (e.g., water) to replace the solvent with water. Subsequently, the membrane can be immersed in a third fluid, e.g., comprising an aqueous solution or a non-aqueous solution, to replace the water with the aqueous compounds solution. The membrane impregnated with the third fluid is exposed to UV radiation.

The membranes of the present invention can be in any suitable configuration, e.g., to provide a filter. Thus, for example, the membrane can be a flat sheet, or in a corrugated, cylindrical, or tubular, form.

The present invention further provides devices, such as filter devices, comprising one or more membranes described above. Typical filter devices comprise a housing, an inlet and at least one outlet defining a fluid flow path, and a membrane of the present invention disposed across or tangential to the fluid flow path. In some embodiments, the filter devices comprise a housing, an inlet, a first outlet, and a second outlet; the inlet and first outlet defining a first fluid flow path between the inlet and the first outlet, and, the inlet and second outlet defining a second fluid flow path between the inlet and the second outlet, and a membrane of the present invention disposed across the first fluid flow path and tangential to the second fluid flow path.

In some embodiments, the filter device includes additional components. For example, in one embodiment, the filter device includes a filter, e.g., comprising, consisting of, or consisting essentially of, an embodiment of a membrane according to the invention, and at least one additional component, such as, for example, support and/or drainage layers and/or cushioning layers. The membrane can comprise a composite, e.g., including at least one additional component. Suitable support, drainage and/or cushioning layers include, but are not limited to, at least one of a mesh, and porous woven or non-woven sheets. The present invention further provides a method for treating a process fluid, e.g., an outgassing liquid, comprising contacting a membrane or filter described above with the fluid and separating matter (e.g., particulate matter) from the process fluid. The method can also include recovering the treated fluid, e.g., a particulate-depleted fluid or a particulate-enriched fluid.

The following examples further illustrate the invention but, of course, should not be construed as in any way limiting its scope. The membranes used in the examples are expanded polytetrafluoroethylene (PTFE) membranes having a nominal pore size of 0.05 microns. Example 8 also uses an expanded PTFE membrane having a nominal pore size of 0.1 microns, as noted.

EXAMPLE 1

This example demonstrates the preparation of a membrane by pulsed blackbody UV radiation according to an embodiment of the invention.

A sheet of a commercially available PTFE membrane (Pall Corporation, East Hills, N.Y.), having a CWST of 25 dynes/cm (0.25 erg/mm$^2$), is immersed in isopropyl alcohol (IPA), and subsequently immersed in deionized (DI) water to replace the IPA with DI water. Subsequently, the membrane is immersed in 0.1 M sodium sulfite ($Na_2SO_3$) to replace the DI water and impregnate the pores with sodium sulfate. The impregnated membrane is positioned in air 1 inch (2.54 cm) from a blackbody UV bulb (Model Rip Tide 8; Pulsar Remediation Technologies, Inc., Roseville, Calif.). The membrane is exposed for 20 seconds to the pulsed broadband blackbody radiation (power density 1.3 kW) and removed from radiation exposure. The membrane is re-impregnated with sodium sulfite and re-exposed to blackbody UV radiation for 20 seconds. The procedure of re-impregnation and re-exposure for 20 seconds is repeated 3 more times so that the membrane is exposed to a total of 100 seconds of UV radiation.

The CWST of the treated membrane is 43 dynes/cm (0.43 erg/mm$^2$). The fluorine/carbon (F/C) ratio, and the oxygen/carbon (O/C) ratio, of the surfaces as determined by X-ray Photoelectron Spectroscopy (XPS) analysis, are 1.6 and 0.05, respectively.

EXAMPLE 2

This example demonstrates the preparation of another embodiment of a membrane by pulsed blackbody UV radiation according to the invention.

A sheet of a commercially available PTFE membrane (Pall Corporation), having a CWST of 25 dynes/cm (0.25 erg/mm$^2$), is immersed in IPA, and subsequently immersed in DI water to replace the IPA with DI water. Subsequently, the membrane is immersed in 0.1 M sodium sulfite ($Na_2SO_3$) to replace the DI water and impregnate the pores with sodium sulfate. The impregnated membrane is positioned in air 1 inch (2.54 cm) from a blackbody UV bulb (Model Rip Tide 8; Pulsar Remediation Technologies, Inc.). The membrane is exposed for 20 seconds to the pulsed broadband blackbody radiation (power density 1.3 kW) and removed from radiation exposure. The membrane is re-impregnated with sodium sulfite and re-exposed to blackbody UV radiation for 20 seconds. The procedure of re-impregnation and re-exposure for 20 seconds is repeated 2 more times so that the membrane is exposed to a total of 80 seconds of UV radiation.

The CWST of the treated membrane is 40 dynes/cm (0.40 erg/mm$^2$). The F/C ratio, and the O/C ratio, of the surfaces as determined by XPS analysis, are 1.8 and 0.015, respectively.

EXAMPLE 3

This example demonstrates the chemical resistance of a membrane according to an embodiment of the invention.

A 90 mm sheet of membrane prepared according to Example 1 is exposed to hot sulfuric acid and hydrogen peroxide as follows.

The sheet is prewet by pumping 3 liters of 100% IPA through and then allowing the sheet to soak in the IPA for 30 minutes. The sheet is flushed with DI water for at least 1 hour. The sheet is exchanged with 30%, 60% and 90% cold sulfuric acid. A sulfuric acid (96%) and hydrogen peroxide (10%) (80:20) mixture is heated to 140° C., and the heated mixture is recirculated through the sheet (in a 90 mm TEFLON™ test jig) for 3 hours with an inlet pressure of 30 psi (about 206.7 kPa). Acid flows are measured at the beginning and end of testing. The sheet is allowed to cool, and exchanged with 60% and 30% sulfuric acid, and then DI water.

The results are as follows. The CWST before exposure is 43 dynes/cm (0.43 erg/mm$^2$), and after exposure is 45 dynes/cm (0.45 erg/mm$^2$). The acid flow at the beginning and end of the test are 162 ml/min, and 138 mi/min, respectively.

The experiment shows blackbody UV irradiation of a sodium sulfite-impregnated PTFE membrane produces a membrane that can withstand a challenge with a hot sulfuric acid and hydrogen peroxide mixture by maintaining the CWST and sulfuric acid flow.

EXAMPLE 4

This example demonstrates the preparation of a membrane by vacuum UV radiation according to another embodiment of the invention.

A sheet of a commercially available PTFE membrane (Pall Corporation), having a CWST of 25 dynes/cm (0.25 erg/mm$^2$), is immersed in IPA, and subsequently immersed in DI water to replace the IPA with DI water. Subsequently, the membrane is immersed in 0.1 M sodium sulfite to replace the DI water and impregnate the pores with sodium sulfite. The impregnated membrane is positioned in nitrogen 3 mm from a high power Vacuum UV bulb (EOS-X Model 172; Harada Corp., Tokyo, Japan) emitting at a wavelength of 172 nm.

The membrane is exposed for 30 minutes to the VUV radiation (power density 6 mW/cm$^2$) and removed from radiation exposure. The membrane is re-impregnated with sodium sulfite and re-exposed to the VUV radiation for 30 minutes.

The CWST of the membrane is 37 dynes/cm (0.37 erg/mm$^2$). The F/C and O/C ratios of the surfaces, as determined by XPS analysis, are 1.73 and 0.03, respectively.

EXAMPLE 5

This example demonstrates the preparation of a membrane by broadband UV radiation according to another embodiment of the invention.

A sheet of a commercially available PTFE membrane (Pall Corporation), having a CWST of 25 dynes/cm, is immersed in IPA, and subsequently immersed in DI water to. replace the IPA with DI water. Subsequently, the membrane is immersed in 0.1 M sodium sulfite to replace the DI water and impregnate the pores with sodium sulfite. The impregnated membrane is immersed in the sodium sulfite solution, and the top surface of the membrane remains ⅛ inch (about 3.2 mm) below the top surface of the solution. The surface of the solution is 2 inches (about 5.1 cm) from a broadband UV bulb (high power medium pressure mercury lamp) (Model no. VPS 1600; Fusion UV Systems, Inc., Gaithersburg, Md.) emitting at wavelengths from 200 to 600 nm. The membrane is irradiated for 2 minutes at a power density of 4.8 kW.

The CWST of the membrane is 42 dynes/cm (0.42 erg/mm$^2$). The F/C and 0/C ratios of the surfaces, as determined by XPS analysis, are 1.75 and 0.05, respectively.

EXAMPLE 6

This example demonstrates the preparation of a membrane by broadband UV radiation according to another embodiment of the invention.

A sheet of a commercially available PTFE membrane (W. L. Gore and Associates, Inc., Newark, Del.), having a CWST of 23.5 dynes/cm (0.235 erg/mm$^2$), is immersed in IPA, and subsequently immersed in DI water to replace the IPA with DI water. Subsequently, the membrane is immersed in 0.1 M sodium sulfite to replace the DI water and impregnate the pores with sodium sulfite. The impregnated membrane is immersed in the sodium sulfite solution, and the top surface of the membrane remains below the top surface of the solution. The surface of the solution is 2 inches (about 5.1 cm) from a broadband UV bulb (high power medium pressure mercury lamp) Model no. VPS 1600; Fusion UV systems) emitting at wavelengths from 200 to 600 nm. The membrane is irradiated for 2 minutes at a power density of 4.8 kW.

The UV-exposed membrane is removed from radiation exposure and immersed in DI water for 1 minute. The membrane is again immersed in sodium sulfite solution while the top surface of the membrane remains below the top surface of the solution. The membrane is again irradiated for 2 minutes at a power density of 4.8 kW. The membrane is immersed in DI water, immersed in sodium sulfite solution, and irradiated six more times for a total UV exposure of 16 minutes.

The CWST of the membrane is 72 dynes/cm (0.72 erg/mm$^2$).

EXAMPLE 7

This example demonstrates the water bubble points of UV-treated membranes according to embodiments of the invention compared to non-UV-treated membranes having substantially the same thickness and pore rating. All of the membranes obtained from Pall Corporation have thicknesses of 75 microns and all of the membranes obtained from W. L. Gore and Associates have thicknesses of 25 microns. Each of the membranes has a nominal pore rating of 0.05 microns.

The water bubble point is determined after mounting a membrane disc in a 47mm jig, prewetting the membrane with IPA, and exchanging the IPA with DI water for 10 minutes. The water wetted membrane is subjected to air pressure from the upstream surface, the pressure is monitored, and the water bubble point is reached when air bubbles are first observed on the downstream surface.

The non-UV-treated membranes are commercially available PTFE membranes (Pall Corporation, East Hills, N.Y., and W. L. Gore and Associates, Inc., Newark, Del.). The water bubble points for the Pall Corporation membranes are 15-20 psi, and the water bubble points for the W. L. Gore and Associates membranes are 20-25 psi.

Four UV-treated PTFE membranes are obtained. The first UV-treated membrane is prepared as in Example 5, and has a water bubble point of 80 psi. The second UV-treated membrane is prepared as in Example 2, and has a water bubble point of 75 psi.

The third UV-treated membrane is prepared as follows. A sheet of a commercially available PTFE membrane (W. L. Gore and Associates, Inc.) is immersed in IPA, and subsequently immersed in DI water to replace the EPA with DI water. Subsequently, the membrane is immersed in 0.1 M sodium sulfite to replace the DI water and impregnate the pores with sodium sulfite. The impregnated membrane is positioned in nitrogen 3 mm from a high power Vacuum UV bulb (MECL 02V; M.D. Excimer, Inc., Yokohama, Japan) emitting at a wavelength of 172 nm. The membrane is exposed for 4 minutes to the VUV radiation (power density 12 mW/cm$^2$). The membrane has a water bubble point of 45 psi.

The fourth UV-treated membrane is prepared as follows. A sheet of a commercially available PTFE membrane (W. L. Gore and Associates) is immersed in IPA, and subsequently immersed in DI water to replace the IPA with DI water. Subsequently, the membrane is immersed in tert-butyl alcohol aq. (35%) to replace the DI water and impregnate the pores with alcohol. The impregnated membrane is positioned in nitrogen 3 mm from a high power Vacuum UV bulb (MECL 02V; M.D. Excimer, Inc.) emitting at a wavelength of 172 nm. The membrane is exposed for 10 minutes to the VUV radiation (power 12 mW/cm$^2$). The membrane has a water bubble point of 60 psi.

This example demonstrates UV-treated membranes according to embodiments of the invention have an increased water bubble point when compared to non-UV-treated membranes have substantially the same thickness and pore rating.

EXAMPLE 8

This example demonstrates the differences in critical wetting surface tensions (CWSTs) through the thickness of UV-treated membranes prepared in accordance with embodiments of the invention compared to non-UV-treated membranes.

Five sets of membranes are tested, and the results are shown in the following Table. The wetting solution is prepared from water/ethanol mixtures. Each membrane has a thickness of 75 microns.

The first and second set of membranes (identified as "a" and "b" in the following Table) are commercially available membranes (Pall Corporation), and are not UV-treated.

The third set of membranes ("c") are prepared as follows. A commercially available roll membrane (Pall Corporation) is immersed in IPA, and subsequently immersed in DI water to replace the IPA with DI water. Subsequently, the membrane is immersed in 0.1 M sodium sulfite to replace the DI water and impregnate the pores with sodium sulfite. The impregnated membrane is immersed in the sodium sulfite solution, and the top surface of the membrane remains below the top surface of the solution. The surface of the solution is 3 inches (about 7.6 cm) from a broadband UV bulb (high power medium pressure mercury lamp) (Model no. VPS 1600; Fusion UV systems) emitting at wavelengths from 200 to 600 nm. The membrane is irradiated (1 ft/min) at a power density of 4.8 kW.

The fourth set of UV-treated membranes ("d") are prepared as follows. A sheet of a commercially available PTFE membrane (Pall Corporation) is immersed in IPA, and subsequently immersed in DI water to replace the IPA with DI water. Subsequently, the membrane is immersed in 0.1 M sodium sulfite to replace the DI water and impregnate the pores with sodium sulfite. The impregnated membrane is positioned in nitrogen 3 mm from a high power Vacuum UV bulb (MECL 02V; MD-Excimer, Inc.; power density 12 mW/cm$^2$) emitting at a wavelength of 172 nm. The membrane is exposed for 4 minutes to the VUV radiation.

The fifth set of UV-treated membranes ("e") are prepared as follows. A sheet of a commercially available PTFE membrane (Pall Corporation) is immersed in IPA, and subsequently immersed in DI water to replace the IPA with DI water. Subsequently, the membrane is immersed in 0.1 M sodium sulfite ($Na_2SO_3$) to replace the DI water and impregnate the pores with sodium sulfate. The impregnated membrane is positioned in air 1 inch (2.54 cm) from a blackbody UV bulb (Model Rip Tide 8; Pulsar Remediation Technologies, Inc.). The membrane is exposed for 15 seconds to the pulsed broadband blackbody radiation (power density 1.3 kW).

| CWST (dynes/cm) of fluid | (a) nominal pore size 0.05 micron | (b) nominal pore size 0.1 micron | (c) nominal pore size 0.05 micron | (d) nominal pore size 0.05 micron | (e) nominal pore size 0.05 micron |
|---|---|---|---|---|---|
| 23.5 | Yes | Yes | Yes | Yes | Yes |
| 25.0 | Yes | Yes | Yes | Yes | Yes |
| 26.5 | No | No | Yes | Yes | Yes |

Each set of membranes is placed on a glass plate, and fluids having surface tensions of 23.5 dynes/cm (0.235 erg/mm$^2$), 25.0 dynes/cm (0.25 erg/mm$^2$), and 26.5 dynes/cm (0.265 erg/mm$^2$) are placed on the non-glass contacting surface of each membrane.

The membranes produced in accordance with embodiments of the invention become transparent, with each of the fluids passing through all portions of the glass-contacting surface to the glass plate. The non-UV treated membranes remain white/opaque, and the fluid having a surface tension of 26.5 dynes/cm (0.265 erg/mm$^2$) does not uniformly pass through to the glass plate. The fluids having surface tensions of 23.5 and 25.0 dynes/cm (0.235 and 0.25 erg/mm$^2$) pass uniformly through the non-TV treated membranes.

This example demonstrates membranes according to embodiments of the invention have a substantially identical CWST of over 26 dynes/cm (0.26 erg/mm$^2$) through the thickness of the membranes.

EXAMPLE 9

This example demonstrates membranes according to embodiments of the invention have a substantially identical CWST through the thickness of the membranes.

In this example, various 0.05 micron nominal pore size PTFE membranes are mounted on a holder, placed in an observation cell, and observed using a microscope-charge coupled device (CCD) camera assembly. The membrane is pressurized with water, and the water surrounding the membrane is replaced with a gas (nitrogen)-enriched water solution. The pressure is reduced to atmospheric pressure to expose the membrane to a supersaturated water-gas solution, and the appearance of the membrane (i.e., with respect to a change in transparency), and the bubble formation on the membrane, are observed.

The following membranes are tested: commercially available PTFE membranes from two different sources (W.L. Gore and Associates, and Pall Corporation), and membranes prepared as described in Examples 4 and 5.

The pressure in the observation cell is raised to 1000 psi so that the membrane pores are filled with water. The nitrogen-enriched water solution replaces the water, and the pressure is reduced to atmospheric pressure in about 60 seconds. Each membrane is observed for at least 10 minutes after the first appearance of bubbles on the surface.

The UV-treated membranes prepared according to Examples 4 and 5 are transparent, and the non-UV-treated membranes, i.e., the commercially available membranes, have portions that are opaque (e.g., white). The transparency of the UV-treated membranes demonstrates the substantially uniform CWST through the thickness of the membranes, whereas the opacity of the non-UV-treated membranes demonstrates a varied CWST through the thickness of the membranes.

The water intrusion pressure measured for the commercially available membranes is higher than that measured for the UV-treated membranes. It is believed this demonstrates that the walls of the pores of the commercially available membranes are not wetted, or less wetted, than the pores of the UV-treated membranes, and thus provide increased resistance to the passage of water therethrough.

EXAMPLE 10

This example demonstrates membranes according to embodiments of the invention have a low level of extractables.

0.05 micron nominal pore size UV treated PTFE membranes and untreated PTFE (control) membranes are obtained. The control membranes are commercially available (Pall Corporation), and the UV treated membranes are prepared as in Example 7, third set of membranes ("c"). The UV treated membrane is prewetted with 25 % DI water/75 % IPA, exchanged with DI water and treated with 0.1 M Na$_2$SO$_3$. The UV-treated membranes are framed and air dried, then washed in cold DI water for 12 hours.

The volume of extraction is 500 ml. The membranes are soaked in 5% HCl for 4 hours at ambient temperature on an orbital shaker. The membranes are removed from the HCl solution, and the extractables are measured. The membranes are rinsed for 10 minutes in running DI water, then soaked in 500 ml of fresh 5% HCl for another 4 hours on an orbital shaker. The extractables are measured.

The extractable levels are determined using an HP 4500 Inductively Coupled Plasma—Mass Spectrometer Model No. IL-ICP-MS-1. ICP-MS standard procedure (GLSM-67) is used to analyze the extracts.

| Element | UV treated 1st extr. step (ppb) | UV treated 2nd extr. step (ppb) | Control 1st extr. step (ppb) | Control 2nd extr. step (ppb) |
|---|---|---|---|---|
| Li | <DL | <DL | <DL | <DL |
| Na | 3.9 | 0.6 | 3.7 | 0.6 |
| Mg | 3.1 | 0.2 | 0.4 | 0.2 |
| Al | 977.5 | 8.4 | 2.1 | 0.9 |
| K | 2.2 | 0.5 | 1.4 | 0.9 |
| Ca | 51.1 | 1.4 | 26.4 | 4.6 |
| Cr | 1.7 | 0.2 | 0.4 | 0.2 |
| Mn | 1.7 | <DL | <DL | <DL |
| Fe | 17.9 | 1.3 | 0.5 | <DL |
| Co | 0.2 | <DL | <DL | <DL |
| Ni | 2.4 | <DL | 0.3 | <DL |
| Cu | 4.4 | <DL | <DL | <DL |
| Ag | <DL | <DL | <DL | <DL |
| Sn | <DL | <DL | <DL | <DL |
| Pb | 0.1 | <DL | <DL | <DL |
| B | 0.2 | 0.2 | 0.3 | 0.4 |
| Ti | 0.3 | <DL | <DL | 0.3 |
| Zn | 94.7 | 0.6 | 0.4 | 5.0 |
| Ba | 0.2 | <DL | 0.1 | 0.1 |
| Total | | 13.4 | | 13.2 |

The extractable levels are determined using an HP 4500 Inductively Coupled Plasma—Mass Spectrometer Model No. IL-ICP-MS-1. ICP-MS standard procedure (GLSM-67) is used to analyze the extracts.

After the second HCl extraction, both the control and UV-treated PTFE membranes display similar levels of released metal elements.

EXAMPLE 11

This example demonstrates membranes according to embodiments of the invention resist dewetting.

47 mm membrane disc (prepared in accordance with Example 9) is pre-wet in IPA, followed by soaking in DI water so that the IPA in the membrane is exchanged with water. The membrane is placed in a glass frit connected to a Buchner funnel, connected to a source of vacuum. 100 mL of DI water at 70° C. is placed on one side of the membrane and a vacuum of about −9 inches (−228.6 mm) of Hg is applied to the other side of the membrane. The membrane is visually checked for any dewetting during the period when the DI water flows through the membrane. The time it takes for the water to flow through is recorded. This is considered the first filtering (or wetting) cycle. The vacuum is maintained for a period of 2 minutes after the upstream side is empty, and the membrane is checked for any dewetting. The vacuum is removed and the system is brought to atmospheric pressure. The upstream side is refilled with another 100 mL of DI water at about 70° C. to about 80° C., and the water allowed to flow through under an applied vacuum, and the flow time is recorded, along with checking for any dewetting. This is considered the second (or the dewetting) cycle. The membrane is tested for 5 cycles (i.e., wetting, dewetting, wetting, dewetting, wetting).

The results are as follows:

| Flow Rate mL/cm$^2$/sec | cycle #1 | cycle #2 | cycle #3 | cycle #4 | cycle #5 |
|---|---|---|---|---|---|
| $F_i$ (initial flow) | 0.105 | 0.101 | 0.095 | 0.097 | 0.094 |
| $F_f$ (final flow) | 0.103 | 0.097 | 0.094 | 0.097 | 0.092 |
| Flow Ratio $F_f/F_i$ | 0.98 | 0.96 | 0.99 | 1.00 | 0.98 |

The foregoing shows that membranes according to embodiments of the invention have a wetting/dewetting ratio of at least 0.96 for 5 cycles.

EXAMPLE 12

This example demonstrates membranes according to embodiments of the invention have a low total organic carbon (TOC) content and, when compared to untreated membranes, rinse comparably to untreated membranes.

47 mm membrane discs (UV treated membranes, prepared as generally described in Example 5 except the power density is 6 kW) and untreated control membranes (Pall Corporation, East Hills, N.Y.) are prewet in 60% IPA/40% DI water, followed by rising in three containers of DI water, and tested for effluent resistivity rinse up. An effluent resistivity value of 17.8 megaohms×cm is selected as the "rinsed up" value.

The results are as follows.

| Sample | Time (min) | Resistivity (megaohm × cm) | TOC (ppb) | Flow rate (ml/min) |
|---|---|---|---|---|
| Control | 79 | 17.8 | 4.89 | 221-225 |
| Control | 71 | 17.8 | 6.25 | 215-240 |
| UV treated | 49 | 17.8 | 2.57 | 218-227 |
| UV treated | 60 | 18.3 | 2.10 | 240-282 |

This example demonstrates membranes according to embodiments of the invention have a low total organic carbon (TOC) content and, when compared to untreated membranes, rinse at least as fast, if not faster, as untreated membranes.

EXAMPLE 13

This example demonstrates the chemical resistance of a membrane according to an embodiment of the invention.

A 90 mm flat sheet of membrane prepared according to Example 6 is exposed to hot sulfuric acid and hydrogen peroxide as follows.

The sheet is prewet by pumping 3 liters of 100% IPA through and then allowing the sheet to soak in the IPA for 30 minutes. The sheet is flushed with DI water for at least 1 hour. The sheet is exchanged with 30%, 60% and 90% cold sulfuric acid. A sulfuric acid (96%) and hydrogen peroxide (3%) (80:20) mixture is heated to 140° C., and the heated mixture is recirculated through the sheet (in a 90 mm TEFLON™ test jig) for 3 hours with an inlet pressure of 30 psi (about 206.7 kPa). Acid flows are measured at the beginning and end of testing. The sheet is allowed to cool, and exchanged with 60% and 30% sulfuric acid, and then DI water.

The results are as follows. The CWST before exposure is 72 dynes/cm (0.72 erg/mm$^2$), and after exposure is 72 dynes/cm (0.72 erg/mm$^2$). The acid flows at the beginning and end of the acid exposure are 432 ml/min, and 420 ml/min, respectively. The water flow prior to the acid exposure is 1,500 ml/min and the water flow after the exposure is 1,480 ml/min.

The experiment shows blackbody UV irradiation of a sodium sulfite-impregnated PTFE membrane produces a membrane that can withstand a challenge with a hot sulfuric acid and hydrogen peroxide mixture by maintaining the CWST, the sulfuric acid flow, and the water flow.

EXAMPLE 14

A membrane is prepared as generally described in Example 6, except that a roll of membrane is treated, rather than a sheet. The take-up roll and mandrel are rotated at 1600 rpm, and the membrane, submerged in 0.1 M sodium sulfite, is exposed to broadband UV. The membrane is exposed to UV light for a total of about 15 to 20 minutes. The membrane has a CWST of 72 dynes/cm (0.72 erg/mm$^2$).

A 47 mm flat sheet of dry UV treated membrane is obtained from the roll, and placed on a vacuum draw down flask. Fifty mL of 98% sulfuric acid is poured into the flask, and the acid solution is pulled through the membrane under a negative pressure of 15 inches mercury.

After 20 seconds, drops of sulfuric acid are collected downstream. The flow rate, 20 drops/sec, does not vary over time.

This example shows that a membrane according to an embodiment of the invention can be wetted out with ambient sulfuric acid by applying a slight pressure drop.

All references, including publications, patent applications, and patents, cited herein are hereby incorporated by reference to the same extent as if each reference were: individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A microporous PTFE membrane comprising:
a first surface and a second surface and a thickness and bulk defined by the first and second surfaces, the microporous PTFE membrane modified by subjecting the microporous PTFE membrane to non-coherent broadband UV irradiation while pores of the membrane are impregnated with a liquid, the membrane having a critical wetting surface tension (CWST) of at least about 40 dynes/cm (0.40 erg/mm$^2$) through the thickness and bulk of the microporous PTFE membrane, a wetting/dewetting ratio of at least about 0.7 for 2 or more cycles, and wherein the first and second surfaces each have a fluorine/carbon (F/C) ratio of about 1.5 or more and an oxygen/carbon (O/C) ratio in the range of from about 0.01 to about 0.15.

2. The microporous PTFE membrane according to claim 1 having a low level of extractables.

3. A microporous PTFE membrane comprising:
a first surface and a second surface and a thickness defined by the first and second surfaces, the microporous PTFE membrane modified by subjecting the microporous PTFE membrane to non-coherent broadband UV irradiation while pores of the membrane are impregnated with a liquid, the membrane having a CWST of at least 26 dynes/cm (0.26 erg/mm$^2$) through the thickness and bulk of the microporous PTFE membrane, and a wetting/dewetting ratio of at least about 0.7 for 2 or more cycles, wherein the microporous PTFE membrane is free of a coating and wherein the first and second surfaces each have a fluorine/carbon (F/C) ratio of about 1.5 or more and an oxygen/carbon (O/C) ratio in the range of from about 0.01 to about 0.15.

4. The microporous PTFE membrane of claim 1, having a water bubble point of at least about 33 psi.

5. The microporous PTFE membrane of claim 3, having a CWST of at least about 40 dynes/cm (0.40 erg/mm$^2$).

6. The PTFE membrane of claim 1, having a nominal pore size in the range of from about 0.02 to about 0.1 microns.

7. The PTFE membrane of claim 1, having a CWST of at least about 45 dynes/cm (0.45 erg/mm$^2$) through the thickness of the membrane.

8. The PTFE membrane of claim 7, having a CWST of at least about 58 dynes/cm (0.58 erg/mm$^2$).

9. The PTFE membrane of claim 2, having a water bubble point of at least about 45 psi (about 310 kPa).

10. The PTFE membrane of claim 3, having a water bubble point of at least about 75 psi (about 516.8 kPa).

11. The PTFE membrane of claim 1, which resists dewetting when contacted with hot water as a degassing fluid.

12. The PTFE membrane of claim 2, having less than about 100 ppb extractable matter.

13. The PTFE membrane of claim 2, having less than about 30 ppb metal extractable matter.

14. The PTFE membrane of claim 3, having less than about 15 ppb metal extractable matter.

15. A process for treating a fluid comprising contacting the membrane claim 1 with the fluid for treating and recovering the treated fluid.

16. The process of claim 15, wherein the fluid for treating is a degassing fluid.

17. The PTFE membrane of claim 1, wherein the membrane is free of a coating.

18. The PTFE membrane of claim 1, modified by subjecting the membrane to non-coherent broadband UV irradiation while pores of the membrane are impregnated with a liquid selected from the group consisting of water, alcohols, hydrogen peroxide, sodium sulfite, ammonium sulfate, ammonium sulfite, sodium aluminate, copper sulfate, boric acid, hydrochloric acid, and nitric acid.

19. The PTFE membrane of claim 3, modified by subjecting the membrane to non-coherent broadband UV irradiation while pores of the membrane are impregnated with a liquid selected from the group consisting of water, alcohols, hydrogen peroxide, sodium sulfite, ammonium sulfate, ammonium sulfite, sodium aluminate, copper sulfate, boric acid, hydrochloric acid, and nitric acid.

20. The PTFE membrane of claim 3, having a CWST of at least about 30 dynes/cm (0.30 erg/mm$^2$) through the thickness and bulk of the membrane.

21. The PTFE membrane of claim 1, having a zeta potential in the range of from about −3 mV to about −11 mV at a pH in the range of from about 4 to about 9.

22. The PTFE membrane of claim 3, having a zeta potential in the range of from about −3 mV to about −11 mV at a pH in the range of from about 4 to about 9.

23. The PTFE membrane of claim 20, having a zeta potential in the range of from about −3 mV to about −11 mV at a pH in the range of from about 4 to about 9.

24. The PTFE membrane of claim 5, having a zeta potential in the range of from about −3 mV to about −11 mV at a pH in the range of from about 4 to about 9.

25. The PTFE membrane of claim 6, having a zeta potential in the range of from about −3 mV to about −11 mV at a pH in the range of from about 4 to about 9.

26. The PTFE membrane of claim 7, having a zeta potential in the range of from about −3 mV to about −11 mV at a pH in the range of from about 4 to about 9.

* * * * *